United States Patent
Sato et al.

(10) Patent No.: US 8,567,458 B2
(45) Date of Patent: Oct. 29, 2013

(54) FUEL FILLER APPARATUS OF VEHICLE

(75) Inventors: Yu Sato, Shioya-Gun (JP); Takeaki Nakajima, Kawachi-Gun (JP); Shoichi Hokazono, Utsunomiya (JP); Shinya Murabayashi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 630 days.

(21) Appl. No.: 12/681,526

(22) PCT Filed: Oct. 6, 2008

(86) PCT No.: PCT/JP2008/068174
§ 371 (c)(1),
(2), (4) Date: Apr. 2, 2010

(87) PCT Pub. No.: WO2009/048044
PCT Pub. Date: Apr. 16, 2009

(65) Prior Publication Data
US 2010/0212780 A1 Aug. 26, 2010

(30) Foreign Application Priority Data

Oct. 12, 2007 (JP) ................................. 2007-266491

(51) Int. Cl.
*B65B 1/04* (2006.01)
*B60K 15/04* (2006.01)

(52) U.S. Cl.
CPC ...................................... *B60K 15/04* (2013.01)
USPC ............................ 141/350; 141/368; 220/86.2

(58) Field of Classification Search
USPC ................... 141/350, 368; 220/86.2
See application file for complete search history.

(56) References Cited

U.S. PATENT DOCUMENTS

| 2,033,432 | A * | 3/1936 | Leach .......................... 220/86.2 |
| 6,302,169 | B1 * | 10/2001 | Pulos ............................. 141/301 |
| 7,077,178 | B2 * | 7/2006 | Hedevang ..................... 141/367 |
| 7,293,586 | B2 * | 11/2007 | Groom et al. .................. 141/350 |
| 7,621,303 | B2 * | 11/2009 | Buchgraber ................... 141/350 |
| 7,665,493 | B2 * | 2/2010 | Groom et al. .................. 141/350 |
| 7,789,113 | B2 * | 9/2010 | Stephan et al. ................ 141/350 |
| 7,950,425 | B2 * | 5/2011 | Och ............................. 141/367 |
| 2007/0125444 | A1 | 6/2007 | Hagano et al. |
| 2008/0237230 | A1 | 10/2008 | Och |
| 2010/0175785 | A1 * | 7/2010 | Groom et al. .................. 141/350 |

FOREIGN PATENT DOCUMENTS

| EP | 1 555 154 A1 | 7/2005 |
| FR | 2 912 697 A1 | 8/2008 |
| JP | 2004-210246 | 7/2004 |
| JP | 2007-153049 A | 6/2007 |
| JP | 2007-518619 A | 7/2007 |
| JP | 2008-168748 A | 7/2008 |
| WO | 2005-077698 A1 | 8/2005 |

* cited by examiner

*Primary Examiner* — Timothy L Maust
(74) *Attorney, Agent, or Firm* — Carrier Blackman & Associates, P.C.; Joseph P. Carrier; Fulchand P. Shende

(57) ABSTRACT

A fuel filler apparatus of a vehicle of the invention, during normal operation, only permits insertion of fuel dispensing nozzles of a diameter within a predefined range, and prevents insertion of fuel dispensing nozzles whose diameter is smaller a lowest value or larger than a highest value of this range. The fuel filler apparatus includes a manual operation override mechanism which by a manual operation permits the insertion of only fuel dispensing nozzles of a diameter smaller than the lowest value of the range under special circumstances.

10 Claims, 3 Drawing Sheets

FUEL FILLER APPARATUS OF VEHICLE

TECHNICAL FIELD

The present invention relates to a fuel filler apparatus of a vehicle, which only permits the insertion of a fuel dispensing nozzle of a diameter within a predefined range, and prevents the insertion of fuel dispensing nozzles whose diameter is smaller or larger than this range.

Priority is claimed on Japanese Patent Application No. 2007-266491, filed 12 Oct. 2007, the content of which is incorporated herein by reference.

BACKGROUND ART

In recent years, with the popularization of passenger vehicles equipped with diesel engines, in order to prevent misfueling (use of the wrong fuel type) between diesel engine vehicles and gasoline engine vehicles, for example, in Europe, light oil dispensing nozzles have a larger diameter than gasoline dispensing nozzles, so that the light oil dispensing nozzle cannot be inserted into the filler opening of a gasoline engine vehicle. On the other hand, a nozzle inhibitor may be provided in the filler opening of a diesel engine vehicle, that with the smaller diameter gasoline dispensing nozzle, disables an opening operation of a predetermined nozzle insertion restricting member to prevent the insertion thereof, and only with a larger diameter gasoline dispensing nozzle, enables the opening operation of the nozzle insertion restricting member, to permit the insertion thereof (refer for example to Patent Document 1).

[Patent Document 1] Specification of U.S. Pat. Publication No. 7,077,178

DISCLOSURE OF INVENTION

Problems to be Solved by the Invention

However, to suit infrastructure development and the like, in some circumstances in Japan, Europe, and the United States, there is the possibility that fuel dispensing nozzles for different fuel types keep the same diameter, and hence there is a demand for countermeasures to deal with such a situation. Therefore, an object of the present invention is to provide a fuel filler apparatus of a vehicle which, during normal operation, only permits the insertion of fuel dispensing nozzles whose diameter is within a predefined range, and prevents the insertion of fuel dispensing nozzles whose diameter is smaller than a lowest value or larger than a highest value of this range, and which can be used even in areas where countermeasures to deal with changes in diameters of fuel dispensing nozzles for each fuel type are not sufficiently widespread.

Means for Solving the Problems

In order to solve the above problems and achieve the related object, the present invention employs the following measures.

(1) A fuel filler apparatus of a vehicle according to the present invention only permits insertion of fuel dispensing nozzles of a diameter within a predefined range, and prevents insertion of fuel dispensing nozzles whose diameter is smaller or larger than this range, and is provided with a manual operation mechanism which by a manual operation permits the insertion of only fuel dispensing nozzles of a diameter smaller than the aforementioned range.

(2) The manual operation mechanism is preferably provided in the vicinity of a filler opening.

(3) An operating part of the manual operation mechanism is preferably provided so as to protrude outside the filler opening.

(4) The fuel filler apparatus preferably is provided with: a cylindrical main body connected to a tip end of a filler neck; a flexible belt member which is arranged in a circular shape at an opening of the filler opening; and a plate-like nozzle insertion restricting member which is arranged between the belt member and the main body, and covers the opening of the filler opening so as to enable the opening to be opened and closed.

(5) Preferably one end of the belt member is rotatably supported on the main body via a fixed shaft, and an other end is rotatably engaged with the nozzle insertion restricting member via a latching pin.

(6) Preferably a plurality of guide pieces which guide insertion of the fuel dispensing nozzle, are provided on an inner circumference side of the belt member.

(7) In a state where the nozzle insertion restricting member covers and closes the opening of the filler opening, preferably an inside diameter of the circular shape formed by the belt member is smaller than an outside diameter of a light oil dispensing nozzle, but larger than an outside diameter of a gasoline dispensing nozzle.

(8) Preferably, when a fuel dispensing nozzle is inserted into the filler opening, the fuel dispensing nozzle expands a diameter of the circular shape formed by the belt member, and opens the nozzle insertion restricting member via the latching pin and the engagement section.

Effects of the Invention

According to the aspect of the invention disclosed in (1) above, even in cases where to suit infrastructure development and the like, fuel dispensing nozzles for different fuel types are the same diameter, by operating the manual operation mechanism as an exceptional measure, only fuel dispensing nozzles whose diameter is smaller than a predefined range can be inserted manually into the filler opening. As a result, the fuel filler apparatus of the present invention can be used even in areas where countermeasures to deal to changes in diameters of fuel dispensing nozzles for each fuel type are not sufficiently widespread.

In the case of (2) above, even if at the time of a fuel filling operation, a fuel dispensing nozzle that does not yet conform to the infrastructure development is encountered, the manual operation mechanism can be operated on the spot.

In the case of (3) above, the operating part of the manual operation mechanism passes through the outside wall of the filler opening, and the through hole thereof can also be used as an outlet for fuel remaining inside the filler opening.

BRIEF DESCRIPTION OF THE REFERENCE SYMBOLS

Figure 1:
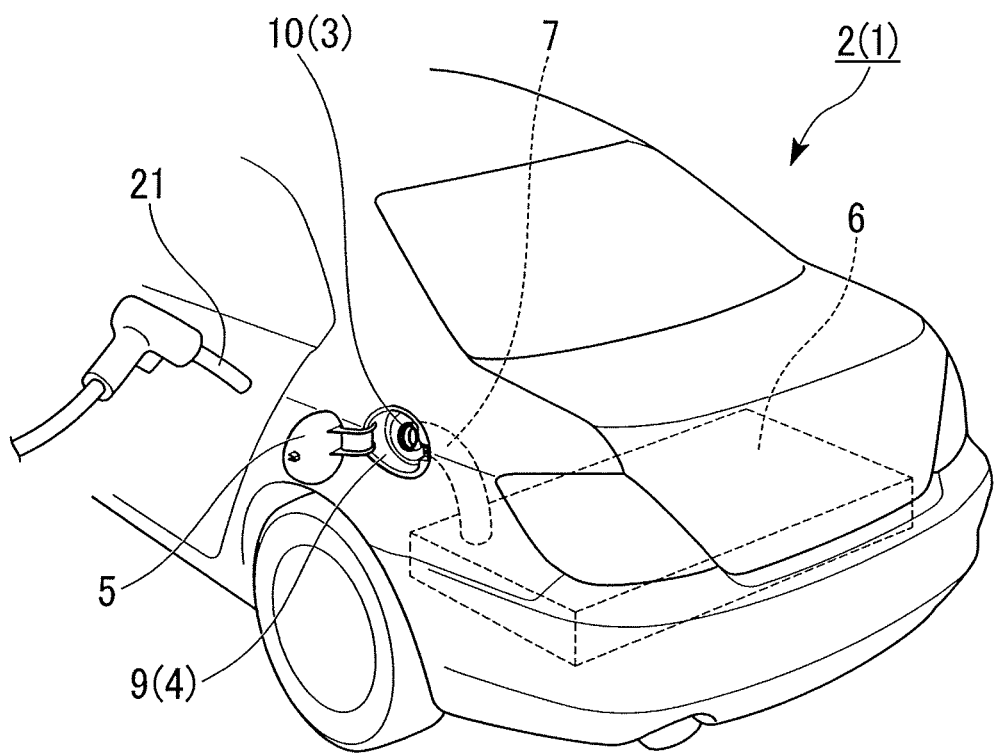
FIG. 1 is a perspective view of a vehicle body rear portion of a vehicle according to an embodiment of the present invention.

1 Vehicle
3 Filler opening
10, 110 Fuel filler apparatus
22 Light oil dispensing nozzle
23 Gasoline dispensing nozzle
25 Manual operation mechanism
26 Operating lever (operating part)

BEST MODE FOR CARRYING OUT THE INVENTION

As follows is a description of an embodiment of the present invention with reference to the drawings.

A vehicle 1 shown in FIG. 1 is a diesel engine vehicle. On a rear left side, for example, of a vehicle body 2 thereof, is provided a vehicle body cavity 4 in which is arranged a filler opening 3, and this vehicle body cavity 4 is able to be opened and closed by means of a fuel lid 5.

The filler opening 3 is composed primarily of a tip end section of a tubular filler neck 7 which extends from a fuel tank 6 installed in a lower part of the vehicle body 2, and a fuel filler apparatus 10 integrally attached to the tip end section.

The tip end section of the filler neck 7 is positioned near the base of a cup-like adapter 9 which forms the vehicle body cavity 4, and the fuel filler apparatus 10 provided so as form an extension of the tip end section, is provided passing through the base of the adapter 9 from the inside of the vehicle to the vehicle outside.

Figure 2A:
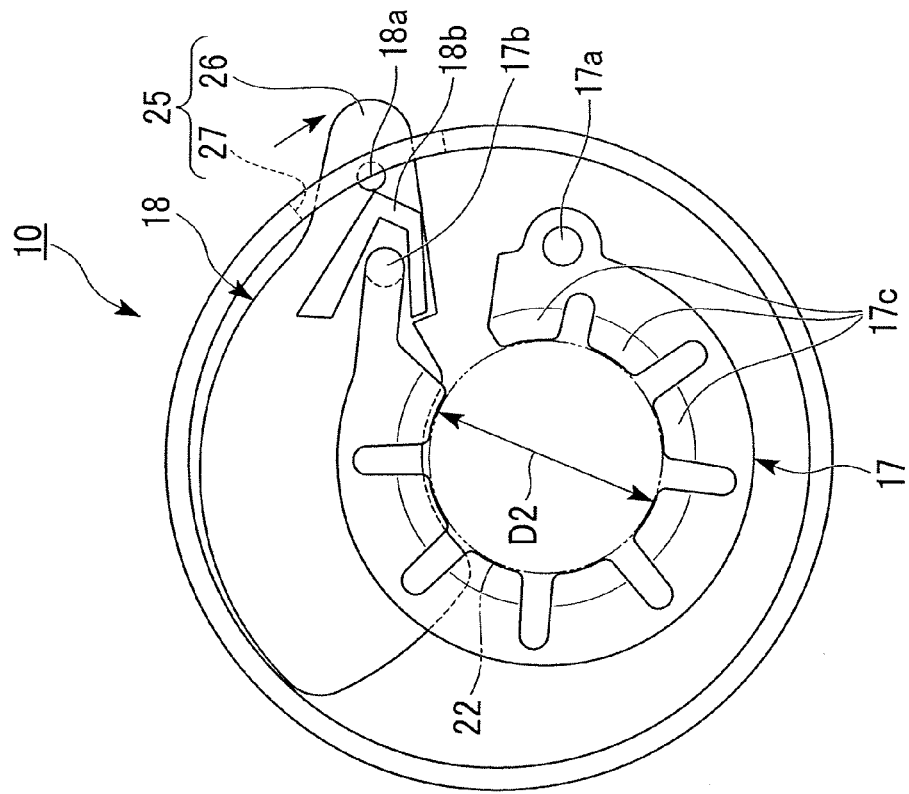
FIG. 2A is a view in the axial direction of a fuel filler apparatus of the vehicle (diesel engine vehicle) when the filler opening is closed.
Figure 2B:
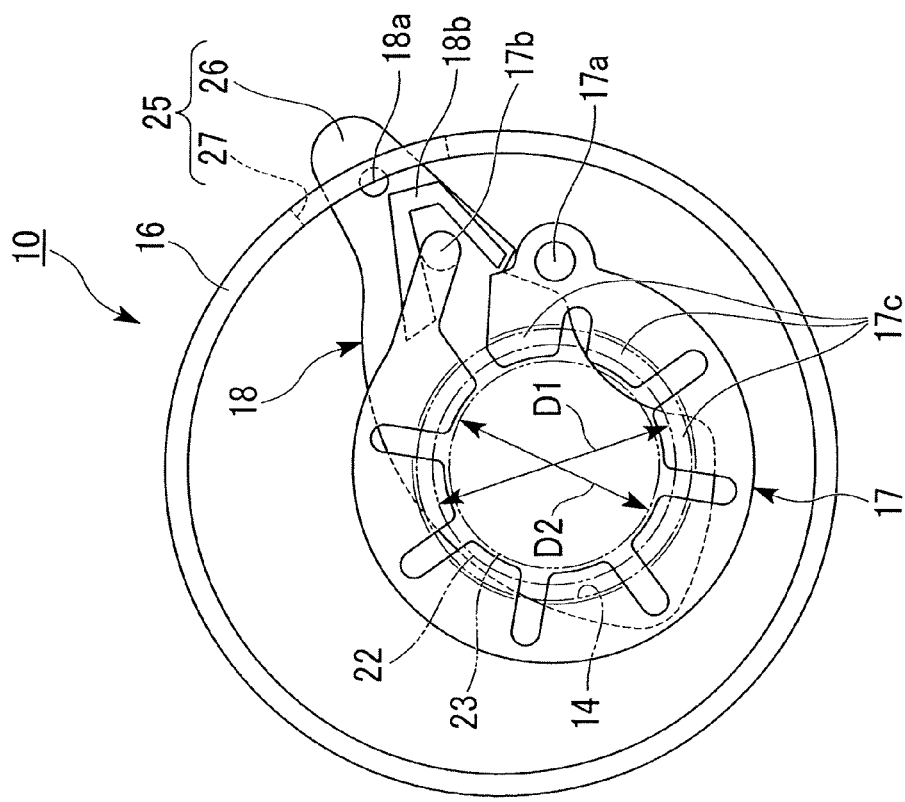
FIG. 2B is a view in the axial direction of a fuel filler apparatus of the vehicle (diesel engine vehicle) when the filler opening is opened.

Referring to FIG. 2A and FIG. 2B, the fuel filler apparatus 10 utilizes the difference between the outside diameters of a fuel dispensing nozzle 21 for light oil (hereafter a light oil dispensing nozzle 22) and a fuel dispensing nozzle 21 for gasoline (hereafter a gasoline dispensing nozzle 23) to prevent misfueling (use of the wrong fuel type) at the time of the fuel filling operation.

That is to say, in the case where as specified by the applicable standards in Europe, a nozzle diameter D1 of the light oil dispensing nozzle 22 of an external fuel filling device is 25 mm, and a nozzle diameter D2 of the gasoline dispensing nozzle 23 is 19 mm, then regarding the fuel filler apparatus 10 in a diesel engine vehicle 1, at the time of inserting the smaller diameter gasoline dispensing nozzle 23, a nozzle insertion restricting member 18 is not opened, preventing insertion of the gasoline dispensing nozzle 23. On the other hand, at the time of inserting the larger diameter light oil dispensing nozzle 22, the nozzle insertion restricting member 18 is opened, permitting insertion of the light oil dispensing nozzle 22. An opening 14 on the vehicle exterior side of the fuel filler apparatus 10 has an inside diameter enabling insertion of the larger diameter light oil dispensing nozzle 22.

The fuel filler apparatus 10 is provided: a cylindrical main body 16 connected to a tip end section of the filler neck 7; a flexible belt member 17 which is arranged in a circular shape at the opening 14 of the filler opening 3; and the plate-like nozzle insertion restricting member 18 which is arranged between the belt member 17 and the main body 16, and covers the opening 14 of the filler opening 3 so as to enable the opening 14 to be opened and closed.

One end of the belt member 17 is rotatably supported on the main body 16 via a fixed shaft 17a, and the other end is rotatably engaged with the nozzle insertion restricting member 18 via a latching pin 17b. A plurality of guide pieces 17c which guide the insertion of the fuel dispensing nozzle, are formed on the inner circumference side of the belt member 17.

One end of the nozzle insertion restricting member 18 is rotatably supported on the main body 16 via a pivot shaft 18a, and the opening 14 is opened and closed by pivoting about the pivot shaft 18a. In the vicinity of the pivot shaft 18a of the nozzle insertion restricting member 18, there is provided an engagement section 18b which engages with the latching pin 17b of the belt member 17.

The nozzle insertion restricting member 18 is biased to close the opening 14 of the filler opening 3. In a state where the nozzle insertion restricting member 18 covers and closes the opening 14, the inside diameter of the circular shape formed by the belt member 17 is smaller than the outside diameter D1 of the light oil dispensing nozzle 22, and slightly larger than the outside diameter D2 of the gasoline dispensing nozzle 23 (refer to FIG. 2A).

When the light oil dispensing nozzle 22 is inserted into the fuel filler apparatus 10 in this state, the light oil dispensing nozzle 22 expands the diameter of the circular shape formed by the belt member 17, and causes an opening action of the nozzle insertion restricting member 18 via the latching pin 17b and the engagement section 18b (refer to FIG. 2B). As a result, by the simple action of inserting the light oil dispensing nozzle 22 into the fuel filler apparatus 10, the opening 14 opens from the closed state, enabling insertion of the light oil dispensing nozzle 22. That is to say, the fuel filler apparatus 10 also functions as a capless mechanism which enables the fuel filling operation to be performed without the need to remove and replace the fuel cap.

Furthermore, if an attempt is made to insert the gasoline dispensing nozzle 23 into the fuel filler apparatus 10 in the above state, the gasoline dispensing nozzle 23 does not expand the diameter of the circular shape formed by belt member 17. Accordingly, the nozzle insertion restricting member 18 does not cause the opening 14 to open, and insertion of the gasoline dispensing nozzle 23 is restricted. When an attempt is made to insert a fuel dispensing nozzle whose diameter is larger than the inside diameter of the opening 14 on the vehicle exterior side, the insertion thereof is restricted by the opening 14 on the vehicle exterior side.

That is to say, the fuel filler apparatus 10 permits the insertion of only fuel dispensing nozzles whose outside diameter is within a predefined range (for example 23.6 to 25.5 mm according to ISO standards) (including the light oil dispensing nozzle 22 conforming to these standards), and prohibits the insertion of fuel dispensing nozzles whose diameter is smaller or larger than this range (including the gasoline dispensing nozzle 23 conforming to these standards).

In the fuel filler apparatus 10, a manual operation mechanism 25 is provided which enables the nozzle insertion restricting member 18 to be opened manually. This component may also be referred to as a manual operation override mechanism 25, since it permits a user to manually override normal blocking operation of the nozzle insertion restricting member 18, as will be further described herein. In the manual operation mechanism 25, an operating lever 26 serving as the operating part thereof extends from the nozzle insertion restricting member 18, and the operating lever 26 projects to the outer peripheral side from a through hole 27 formed in the outer peripheral wall of the main body 16. By operating this operating lever 26 manually, the nozzle insertion restricting member 18 can be operated so as to open the opening 14 regardless of the outside diameters D1 and D2 of the fuel dispensing nozzles 22 and 23. The through hole 27 for the operating lever 26 provided in the main body 16 corresponds to the through hole 27 in the outside wall of the filler opening 3. By directing the through hole 27 downwards, the through hole 27 can also be used as an outlet for fuel remaining inside the fuel filler apparatus 10.

Figure 3A:
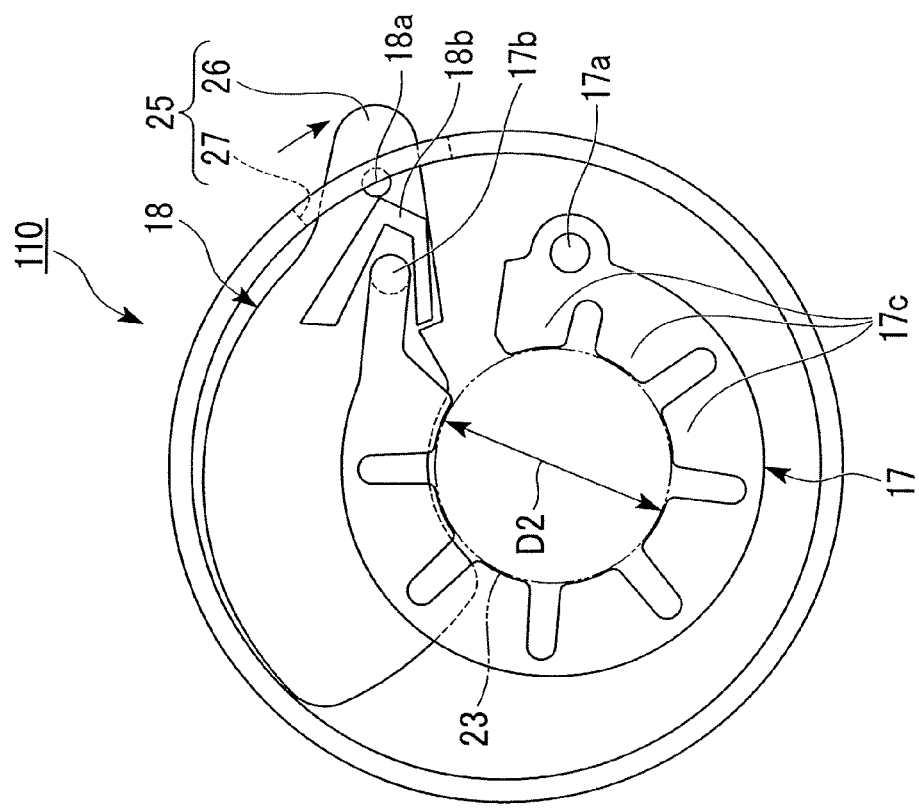
FIG. 3A is a view in the axial direction of a fuel filler apparatus of a gasoline engine vehicle when the filler opening is closed.
Figure 3B:
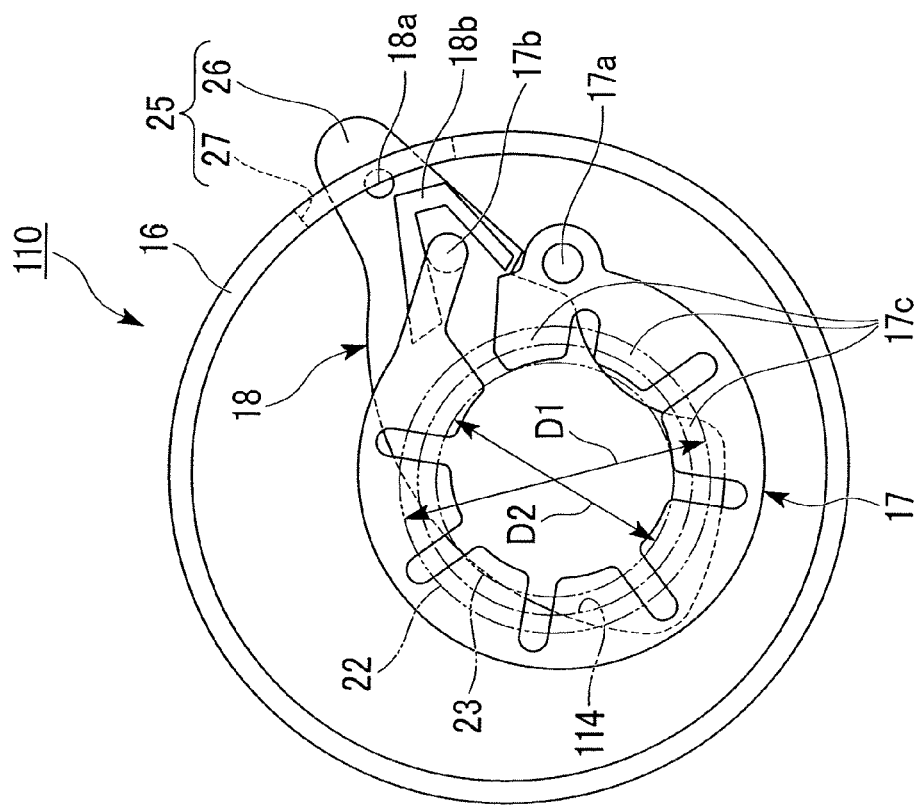
FIG. 3B is a view in the axial direction of a fuel filler apparatus of a gasoline engine vehicle when the filler opening is opened.

FIG. 3A and FIG. 3B show a fuel filler apparatus 110 provided in the filler opening 3 of a gasoline engine vehicle.

An opening 114 on the vehicle exterior side of the fuel filler apparatus 110 has an inside diameter which permits the insertion of the smaller diameter gasoline dispensing nozzle 23 but prevents the insertion of the larger diameter light oil dispensing nozzle 22.

In the fuel filler apparatus 110, in a state where the nozzle insertion restricting member 18 blocks the opening 114, the inside diameter of the circular shape formed by the belt member 17 is smaller than the outside diameter D2 of the gasoline dispensing nozzle 23 (refer to FIG. 3A).

When the gasoline dispensing nozzle 23 is inserted into the filler opening device 110 in this state, the gasoline dispensing nozzle 23 expands the diameter of the circular shape formed by the belt member 17, and operates the nozzle insertion restricting member 18 so as to open the opening 114 via the latching pin 17b and the engagement section 18b (refer to FIG. 3B). As a result, by the simple action of inserting the gasoline dispensing nozzle 23, the opening 114 opens from the closed state, enabling insertion of the gasoline dispensing nozzle 23.

Furthermore, if an attempt is made to insert a dispensing nozzle with too small a diameter into the filler opening device 110 in the above state, the dispensing nozzle does not expand the diameter of the circular shape formed by the belt member 17. Accordingly, the nozzle insertion restricting member 18 does not operate so as to open the opening 114, and insertion of the dispensing nozzle with too small a diameter is restricted. When an attempt is made to insert a fuel dispensing nozzle whose diameter is larger than the inside diameter of the opening 114 on the vehicle exterior side, the insertion thereof is restricted by the opening 114 on the vehicle exterior side.

That is to say, the fuel filler apparatus 110 permits the insertion of only fuel dispensing nozzles whose outside diameter is within a predefined range (including the gasoline dispensing nozzle 23 conforming to the above standards), and prohibits the insertion of fuel dispensing nozzles whose diameter is smaller or larger than this range (including the light oil dispensing nozzle 22 conforming to the above standards). The outside diameter of the gasoline dispensing nozzle 23, for example according to ISO standards, is 21.3 mm or smaller.

Here, also in the fuel filler apparatus 110, a manual operation mechanism 25 is provided which enables the nozzle insertion restricting member 18 to be opened manually. As a result, the nozzle insertion restricting member 18 can be operated so as to open the opening 114 regardless of the outside diameter of the fuel dispensing nozzle, thereby permitting the insertion of fuel dispensing nozzles with diameters smaller than the predefined range.

As described above, the fuel filler apparatus 10 and 110 permit the insertion of only the fuel dispensing nozzle 22 or 23 whose diameter is within in a predefined range, and prevents the insertion of fuel dispensing nozzles whose diameter is smaller or larger than this range. Furthermore, the fuel filler apparatus 10 and 110 are provided the manual operation mechanism 25 which by a manual operation permits the insertion of fuel dispensing nozzles whose diameter is smaller than the predefined range into the filler opening 3.

With this construction, even in cases where to suit infrastructure development and the like, fuel dispensing nozzles for different fuel types are the same diameter, by operating the manual operation mechanism 25 as an exceptional measure, only fuel dispensing nozzles whose diameter is smaller than a predefined range can be inserted manually into the filler opening 3. As a result, the fuel filler apparatus 10 and 110 of the present invention can be used even in areas where countermeasures to deal with changes in diameters of fuel dispensing nozzles for each fuel type are not sufficiently widespread.

Furthermore, in the fuel filler apparatus 10 and 110, the manual operation mechanism 25 is provided in the vicinity of the openings 14 and 114 of the filler opening 3. Therefore, even if at the time of a fuel filling operation, a fuel dispensing nozzle that does not yet conform to the infrastructure development is encountered, the manual operation mechanism 25 can be operated on the spot.

In addition, in the fuel filler apparatus 10 and 110, by providing the operating lever 26 of the manual operation mechanism 25 so as to project to the outside of the main body 16, the operating lever 26 passes through the outside wall of the filler opening 3, and the through hole 27 thereof can be used as an outlet for fuel remaining inside the filler opening 3.

INDUSTRIAL APPLICABILITY

Even in cases where to suit infrastructure development and the like, fuel dispensing nozzles for different fuel types keep the same diameter, by operating the manual operation mechanism as an exceptional measure, only fuel dispensing nozzles whose diameter is smaller than a predefined range can be inserted manually into the filler opening. As a result, the filler opening device of the present invention can be used even in areas where countermeasures to deal with changes in diameters of fuel dispensing nozzles for each fuel type are not sufficiently widespread.

The invention claimed is:

1. A fuel filler apparatus of a vehicle that, during normal operation thereof, only permits insertion of fuel dispensing nozzles of a diameter within a predefined range, and prevents insertion of fuel dispensing nozzles whose diameter is smaller than a lowest value or larger than a highest value of the predefined range, said fuel filler apparatus having a filler opening formed therein;

the fuel filler apparatus comprising:

a belt member having a circular shape, said belt member arranged around the filler opening, said belt member being operable to rotate while an inside diameter of the circular shape expands by contact of the fuel dispensing nozzle with the belt member, wherein a diameter of the fuel dispensing nozzle is larger than the inside diameter of the circular shape of the belt member;

a nozzle insertion restricting member provided at a position closer to inside of the vehicle than the position of the belt member; and a manual operation override mechanism which, by a manual operation thereof enables said nozzle insertion restricting member to be opened manually, and permits the insertion of fuel dispensing nozzles of a diameter smaller than the lowest value of the predefined range.

2. The fuel filler apparatus of a vehicle according to claim 1, wherein the manual operation override mechanism is provided in the vicinity of the filler opening.

3. A fuel filler apparatus of a vehicle according to claim 1, wherein an operating part of the manual operation override mechanism is configured so as to protrude outside of the filler opening; and wherein said operating part extends from said nozzle insertion restricting member.

4. A fuel filler apparatus of a vehicle that, during normal operation thereof, only permits insertion of fuel dispensing nozzles of a diameter within a predefined range, and prevents insertion of fuel dispensing nozzles whose diameter is smaller than a lowest value or larger than a highest value of said predetermined range, the fuel filler apparatus comprising:
- a manual operation override mechanism which by a manual operation thereof, permits the insertion of only fuel dispensing nozzles of a diameter smaller than the lowest value of the range;
- a filler neck having a tip end section;
- a cylindrical main body connected to the tip end section of the filler neck;
- a flexible belt member which is arranged in a circular shape at an opening of the filler neck, and
- a plate-like nozzle insertion restricting member which is arranged between the belt member and the cylindrical main body; and which selectively covers the opening of the filler neck so as to enable the opening to be opened and closed.

5. The fuel filler apparatus of a vehicle according to claim 4, wherein one end of the belt member is rotatably supported on the main body via a fixed shaft, while an other end thereof is rotatably engaged with the nozzle insertion restricting member via a latching pin.

6. The fuel filler apparatus of a vehicle according to claim 5, wherein a plurality of guide pieces which guide insertion of the fuel dispensing nozzle, are provided on an inner circumference side of the belt member.

7. The fuel filler apparatus of a vehicle according to claim 4, wherein
in a state where the nozzle insertion restricting member covers and closes the opening of the filler opening, an inside diameter of the circular shape formed by the belt member is smaller than an outside diameter of a light oil dispensing nozzle, but larger than an outside diameter of a gasoline dispensing nozzle.

8. The fuel filler apparatus of vehicle according to claim 4, wherein
when a fuel dispensing nozzle is inserted into the filler opening, the fuel dispensing nozzle expands a diameter of the circular shape formed by the belt member, and opens the nozzle insertion restricting member via the latching pin and an engagement section.

9. The fuel filler apparatus of vehicle according to claim 1, wherein the lowest value of said predefined range is 23.6 mm.

10. The fuel filler apparatus of vehicle according to claim 1, wherein the highest value of said predefined range is 25.5 mm.

* * * * *